(12) United States Patent
Lammers et al.

(10) Patent No.: US 9,393,845 B2
(45) Date of Patent: *Jul. 19, 2016

(54) APPARATUS AND METHOD FOR CONFIGURING A TIRE PRESSURE MONITORING SYSTEM

(71) Applicant: Bendix Commercial Vehicle Systems LLC, Elyria, OH (US)

(72) Inventors: Shawn D Lammers, Delta (CA); Jon D Intagliata, Avon, OH (US); Joseph M Macnamara, Ashland, OH (US); Sharon A Seitz, Broadview Hts., OH (US); Daniel P Zula, North Ridgeville, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,816

(22) Filed: Aug. 18, 2015

(65) Prior Publication Data

US 2016/0039256 A1    Feb. 11, 2016

Related U.S. Application Data

(63) Continuation of application No. 13/973,004, filed on Aug. 22, 2013, now Pat. No. 9,139,054.

(51) Int. Cl.
  *B60C 23/04*     (2006.01)
(52) U.S. Cl.
  CPC ......... *B60C 23/0488* (2013.01); *B60C 23/0461* (2013.01); *B60C 23/0472* (2013.01); *B60C 23/0481* (2013.01)

(58) Field of Classification Search
  CPC  B60C 23/0488; B60C 23/0481; B60C 23/10; B60C 23/0461; B60C 23/0472
  USPC .................................................. 701/29.7, 29.6
  See application file for complete search history.

(56) References Cited

U.S. PATENT DOCUMENTS

| | | |
|---|---|---|
| 5,591,906 A | 1/1997 | Okawa |
| 6,064,936 A | 5/2000 | Nakajima |
| 6,188,948 B1 | 2/2001 | Shivler |
| 6,435,020 B1 | 8/2002 | Oldenettel |
| 7,104,438 B2 | 9/2006 | Benedict |
| 7,313,953 B2 | 1/2008 | Hernando |
| 7,564,344 B2 | 7/2009 | Deniau |
| 7,769,510 B2 | 8/2010 | Denholm |
| 7,873,449 B2 | 1/2011 | Bujak |

(Continued)

*Primary Examiner* — Richard Camby
(74) *Attorney, Agent, or Firm* — Cheryl L. Greenly; Brian E. Kondas; Eugene E. Clair

(57) ABSTRACT

Various embodiments of an apparatus and method for configuring a tire pressure monitoring system are disclosed. One method comprises rotating a first tire of a plurality of tires on a vehicle and receiving a signal indicative of the speed of rotation of the first tire from a wheel speed sensor associated with the first tire. A controller associates the first tire with a wheel location in response to receiving the signal from the wheel speed sensor. A tire pressure sensor in the first tire generates a tire characteristic signal in response to the rotation of the first tire. The controller receives the tire characteristic signal and associates the tire characteristic signal with the wheel location in response to receiving the tire characteristic signal within a predetermined time period from receiving the signal indicative of the speed of rotation of the first wheel.

17 Claims, 3 Drawing Sheets

(56) References Cited

U.S. PATENT DOCUMENTS

| | | |
|---|---|---|
| 7,916,010 B2 | 3/2011 | McQuade |
| 7,940,164 B2 | 5/2011 | Stegman |
| 8,217,776 B2 | 7/2012 | Hyde |
| 8,240,197 B2 | 8/2012 | Lawrence |
| 8,279,055 B2 | 10/2012 | Isomura |
| 8,332,104 B2 | 12/2012 | Greer |
| 2006/0012469 A1 | 1/2006 | Hirai |
| 2012/0029767 A1 | 2/2012 | Bailie |
| 2012/0059551 A1 | 3/2012 | Juzswik |
| 2012/0112899 A1 | 5/2012 | Hannon |
| 2012/0223828 A1 | 9/2012 | Amato |
| 2013/0145835 A1 | 6/2013 | Ji |
| 2014/0207329 A1 | 7/2014 | Juzswik |

APPARATUS AND METHOD FOR CONFIGURING A TIRE PRESSURE MONITORING SYSTEM

CROSS-REFERENCE TO RELATED APPLICATIONS

The present application is a continuation of application Ser. No. 13/973,004 filed Aug. 22, 2013. The entire disclosure of the aforementioned application is herein expressly incorporated by reference.

BACKGROUND

The present invention relates to embodiments of an apparatus and method for configuring a tire pressure monitoring system. Tire pressure monitoring systems for vehicles typically include at least one tire pressure sensor in each of the plurality of tires. The tire pressure sensors communicate tire pressure signals wirelessly with a central controller on the vehicle. The wheel from which the tire pressure sensor signal is originating must be identified to indicate properly to the driver or technician which tire is in need of service. One method commonly used to associate a tire pressure sensor with the wheel location in which it is installed is carried out by manually updating the central controller with the tire pressure sensor unique ID when the tire with the tire pressure sensor is installed on the vehicle. This method requires time and effort from a trained technician who has the means to activate the tire pressure sensor to obtain the unique ID and communicate with the central controller at the same time.

Trucks and/or tractors typically have at least six tires in which tire pressure sensors are installed. The tires are installed on the truck as one of the last items during an assembly line operation at an original equipment manufacturer. It is a time consuming activity to manually activate each tire pressure sensor to obtain the unique ID and then access the central controller to associate the unique ID with the wheel location in which the tire pressure sensor is installed. Often there is limited time available during the assembly process to add another step to the process. Likewise, whenever a tire is replaced, the central controller needs to be manually updated to associate the new tire pressure sensor unique ID with the proper wheel location.

SUMMARY

Various embodiments of a tire pressure monitoring system are disclosed. In accordance with one aspect, the tire pressure monitoring system comprises a tire pressure monitoring controller. The tire pressure controller comprises a plurality of wheel speed ports for receiving wheel speed sensor signals, each of the plurality of wheel speed ports correlated with a specific wheel location; a communication port for receiving a plurality of tire characteristic messages; and a processing unit comprising control logic, wherein the processing unit is in communication with the plurality of wheel speed ports and the communication port. The control logic is capable of receiving a signal indicative of a wheel speed at a first wheel speed port correlated with a first wheel location; associating the wheel speed signal with a wheel location based on the identification of the wheel speed port that receives the wheel speed signal; receiving a tire characteristic message at the communication port; determining the wheel location of the tire characteristic message as being the first wheel location based on the association of the wheel speed signal and the tire characteristic signal; and assigning the unique sensor identification to the first wheel location.

In accordance with another aspect, a method for configuring a tire characteristic monitoring system comprises rotating a first tire of a plurality of tires on a vehicle; receiving a signal indicative of the speed of rotation of the first tire from a wheel speed sensor associated with the first tire. The method further includes associating the first tire with a first wheel location in response to receiving the signal from the wheel speed sensor; generating a tire characteristic signal in response to the rotation of the first tire from a tire sensor associated with the first tire, the tire characteristic signal comprising a unique sensor identification. The method further includes receiving the tire characteristic signal; associating the unique sensor identification with the first wheel location in response to receiving the tire characteristic signal within a first predetermined time period after receiving the signal indicative of the speed of rotation of the first wheel.

In accordance with another aspect, a method for configuring a tire characteristic monitoring system comprises rotating a first tire of a plurality of tires, the first tire located at a predetermined wheel location on a vehicle. The tire sensor associated with the first tire generates a tire characteristic signal in response to the rotation of the first tire, the tire characteristic signal including an indication of the tire rotation. The controller receives the tire characteristic signal and associates the tire sensor with the predetermined wheel location in response to receiving the tire characteristic signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
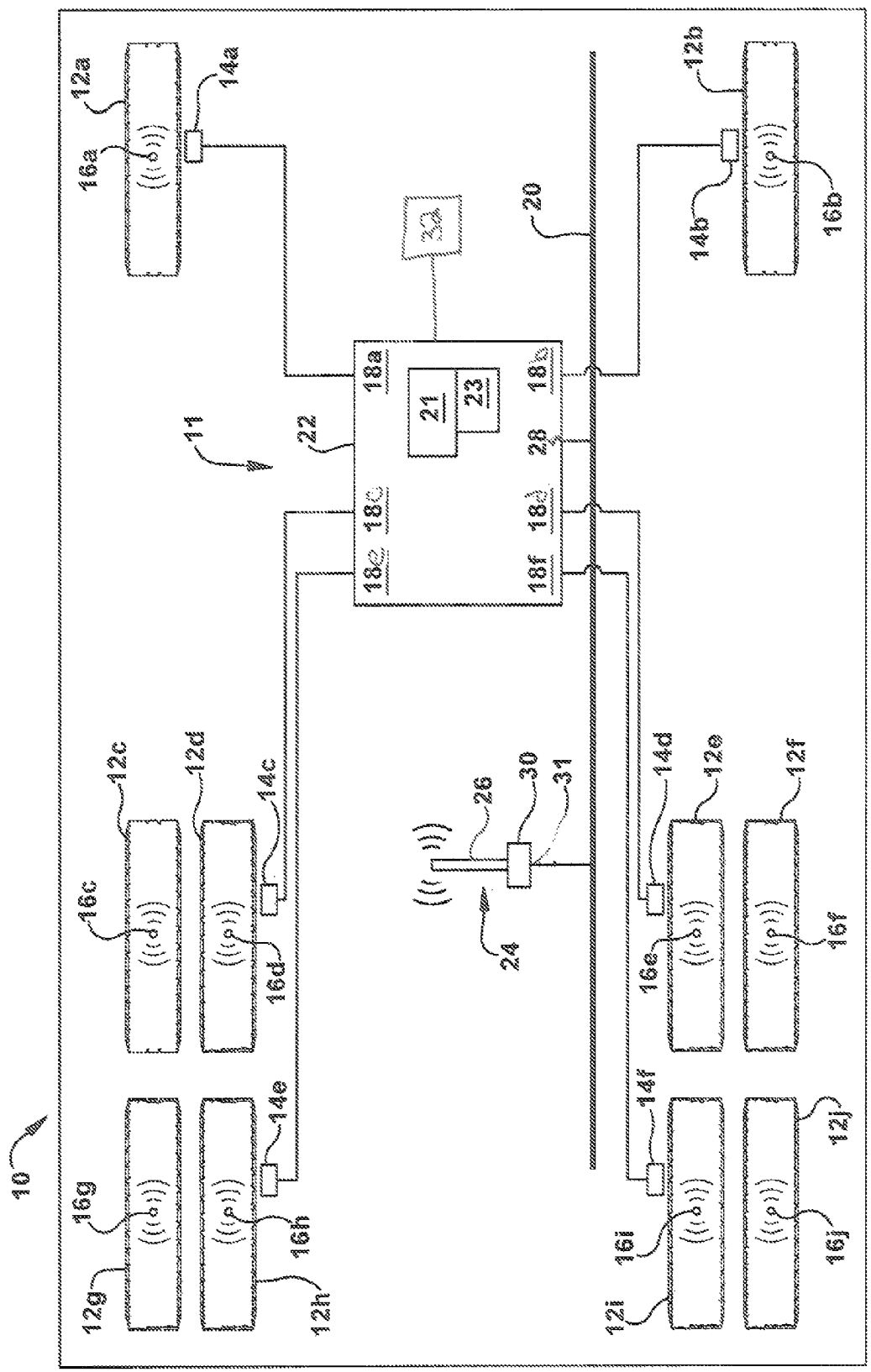
FIG. 1 illustrates a schematic representation of a tire sensor system according to an embodiment of the present invention.

With reference to FIG. 1, a vehicle 10 with a tire sensor system 11 is illustrated. The vehicle 10, a tractor or a truck, generally has at least six wheel locations with at least six tires. The wheel locations include right front, right mid, right rear, left front, left mid and left rear. The right mid, right rear, left mid and left rear wheel locations include an inner and an outer wheel location if dual tires are placed at these locations, increasing the total number of wheel locations to ten. A sample tire placement is illustrated in FIG. 1 with tire 12*a* at the left front, tire 12*b* at the right front, tire 12*c* at the outer left mid, tire 12*d* at the inner left mid, tire 12*e* at the inner right mid, tire 12*f* at the outer right mid, tire 12*g* at the outer left rear, tire 12*h* at the inner left rear, tire 12*i* at the inner right rear, and tire 12*j* at the outer right rear. More or fewer tires are contemplated.

Each tire in the tire sensor system 11 includes a tire pressure sensor, illustrated by tire pressure sensors 16*a*, 16*b*, 16*c*, 16*d*, 16*e*, 16*f*, 16*g*, 16*h*, 16*i*, 16*j*. The tire pressure sensor 16*a*, 16*b*, 16*c*, 16*d*, 16*e*, 16*f*, 16*g*, 16*h*, 16*i*, 16*j* may be mounted inside the tires 12*a*, 12*b*, 12*c*, 12*d*, 12*e*, 12*f*, 12*g*, 12*h*, 12*i*, 12*j* on the rim or outside the tire on a valve stem. The tire pressure sensors 16a, 16b, 16c, 16d, 16e, 16f, 16g, 16h, 16i, 16j monitor the tire pressure. The tire pressure sensors may also monitor other tire characteristic information such as tire temperature, sensor battery voltage, vehicle load and tire vibration. The tire pressure sensor may include an accelerometer or centrifugal switch to monitor motion of the wheel. The tire pressure sensors 16a, 16b, 16c, 16d, 16e, 16f, 16g, 16h, 16i, 16j may be tire pressure sensors used in the Smartire® Tire Pressure Monitoring System from Bendix Commercial Vehicle Systems LLC, for example. Each tire pressure sensor 16a, 16b, 16e, 16d, 16e, 16f, 16g, 16h, 16i, 16j comprises a wireless transmitter that periodically transmits signals containing the tire characteristic information and a unique sensor identification code (ID) in a selected data format. The format may be a standard or a proprietary radio frequency (RE) protocol. The tire pressure sensors 16a, 16b, 16c, 16d, 16e, 16f, 16g, 16h, 16i, 16j may also be configured to transmit signals upon rotation of the tire or when there is a tire pressure alert event.

The tire sensor system 11 includes a wireless receiver 24. The wireless receiver 24 includes an antenna 26, a processing unit 30 and a communication port 31. The wireless receiver 24 receives the signals in the selected data format containing the tire characteristic information and unique sensor ID from the tire pressure sensors 16a, 16b, 16e, 16d, 16e, 16f, 16g, 16h, 16i, 16j wirelessly. The wireless receiver 24 decodes the tire characteristic information from the selected data format to a tire characteristic message capable of being communicated on a serial communication bus 20. The format of the tire characteristic message may be a standard protocol, such as SAE J1939, or a proprietary protocol. The wireless receiver 24 is capable of communicating the tire characteristic messages over the serial communication bus 20 via the communication port 31. The tire characteristic message includes information such as the instantaneous tire pressure, the comparison of the tire pressure against a tire pressure limit, vehicle motion and the unique sensor ID.

The vehicle 10 includes a wheel speed sensor at each wheel location, illustrated by 14a, 14b, 14e, 14d, 14e, 14f. Each wheel speed sensor 14a, 14b, 14e, 14d, 14e, 14f monitors the wheel speed at the wheel location. There is generally not a wheel speed sensor for each tire when more than one tire is located at a wheel location, such as with dual tire installations.

The tire sensor system 11 includes a controller 22. The controller 22 may be a stand-alone controller or include functionality for controlling the braking system in addition to tire pressure monitoring. The wheel speed sensors 14a, 14b, 14e, 14d, 14e, 14f communicate wheel speed to the controller 22 via a hard-wired connection through individual wheel speed ports 18a, 18b, 18c, 18d, 18e, 18f on the controller 22. As shown in FIG. 1, wheel speed port 18a is associated with the wheel speed sensor 14a, which is located at the left front wheel location. Similarly wheel speed port 18b is associated with wheel speed sensor 14b, which is located at the left front wheel location, etc. The wiring for vehicle 10 is configured so that the wheel speed sensor 14a located at the left front wheel end section is always connected to wheel speed port 18a on the controller. Alternatively, the wheel speed information is received via another means, such as over the serial communication bus 20 or via a wireless receiver.

The controller 22 includes a communication port 28 for communicating with the serial communication bus 20 on the vehicle 10. Controller 22 may communicate with other controllers on the vehicle 10 using the serial communication bus 20 when using a standardized serial communication bus format such as SAE J1939.

The controller 22 includes a processing unit 21 and control logic 23. The processing unit 21 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit.

The control logic 23 receives the wheel speed sensor signals from the individual wheel speed sensors 14a, 14b, 14e, 14d, 14e, 14f at the individual wheel speed ports 18a, 18b, 18e, 18d, 18e, 18f. Because of the wiring configuration, the control logic 23 associates a wheel speed sensor signal received at wheel speed port 18a as originating from the wheel speed sensor 14a located at the left front wheel location on the vehicle 10. Similarly, the remaining wheel speed sensor signals are associated with specific wheel locations based on the wheel speed port where the wheel speed sensor signal is received.

The control logic 23 receives messages from the serial communication bus 20 via the communication port 28. The messages include tire characteristic messages as transmitted on the serial communication bus 20 from the wireless receiver 24. The control logic 23 also transmits messages to the serial communication bus 20 via the communication port 28. The transmitted messages include the tire characteristic messages with associated wheel location and the wheel speed.

It is contemplated that the wireless receiver 24 could be integrated with the controller 22. The control logic 23 of the controller 22 would decode the data in the tire characteristic signals directly and not monitor the serial communication bus 20 for the separate tire characteristic messages.

The tire sensor system 11 may optionally include a display device 32. The display device may be connected with the controller 22 or to the serial communication bus 20. The display device 32 communicates the status of the tire sensor system 11 to a vehicle operator or technician. The control logic 23 may also record a fault and transmit a fault signal directly to the display device 32 or via the serial communication bus 20.

As stated previously, there is a need for an improved system to configure a tire pressure monitoring system for tractors and trucks so each tire pressure sensor is quickly and accurately associated with the wheel location where it is installed. The method of configuring the tire pressure monitoring system will not require a separate download of sensor identification numbers to the central controller or additional tools such as sensor initiators. The method may also be used to identify tire sensor locations on other multi-wheeled vehicles, such as trailers.

Accordingly, a controller for a tire pressure monitoring system is disclosed. The controller comprises a plurality of wheel speed ports for receiving wheel speed sensor signals, each wheel speed port correlated with a specific wheel location. The controller includes a communication port for receiving a plurality of tire characteristic messages and a processing unit comprising control logic. The control logic is capable of receiving a signal indicative of a wheel speed at a first wheel speed port, receiving a tire characteristic message at the communication port; determining the specific wheel location of the tire characteristic signal as being the same wheel location of the wheel speed signal based on the association of the wheel speed signal and the tire characteristic message; and assigning the unique sensor identification to the first wheel location.

Figure 2:
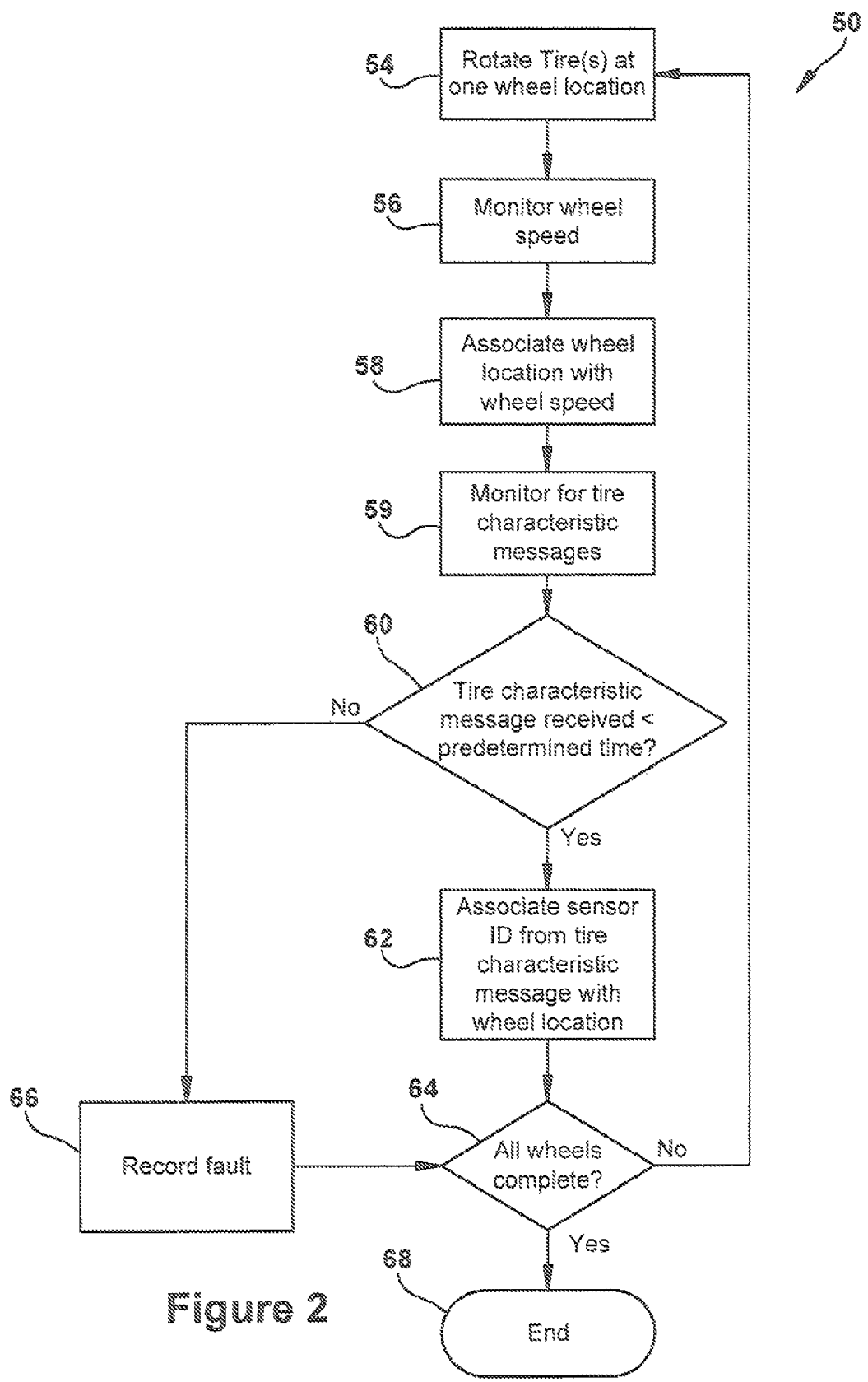
FIG. 2 illustrates a method of implementing the tire sensor system, according to an embodiment of the present invention.

A flowchart for implementing a method 50 of the present invention is shown in FIG. 2.

Prior to the implementation of the method 50, each tire 12a, 12b, 12c, 12d, 12e, 12f, 12g, 12h, 12j is placed at a specific wheel location on the vehicle. Alternatively, one tire can be placed at a specific wheel location at a time and the method executed in a predetermined sequence. Each tire 12a, 12b, 12c, 12d, 12e, 12f, 12g, 12h, 12j has a tire pressure sensor 16a, 16b, 16c, 16d, 16e, 16f, 16g, 16h, 16i, 16j installed. For the present illustration, tire 12a is located on the left front wheel end section of the vehicle. Tire 12b is located on the right front wheel end section of the vehicle. Tire 12c is located at the outer left mid wheel location and 12d is located at the inner left mid wheel end section. Tire 12e is located at the inner right mid wheel location and 12f is located in the outer right mid wheel location. Tire 12g is located at the outer left rear wheel location and 12h is located in the inner left rear wheel location. Tire 12i is located at the inner right rear wheel location and 12j is located at the outer right rear section of the vehicle. The tire placement is done by a vehicle original equipment manufacturer or by a technician servicing the vehicle. At this point, the controller 22 does not have information regarding the placement of the tires 12a, 12b, 12c, 12d, 12e, 12f, 12g, 12h, 12j at a specific wheel location.

First, in step 54, a tire (or tires) at a single wheel location is rotated. For example tire 12a at the left front wheel location is rotated. The tire 12a can be rotated by an automatic machine, like a dynamometer, or manually by the service technician. The tire 12a should be rotated for a minimum of about fifteen seconds at a speed of about three miles per hour. Wheel speed sensor 14a will transmit an analog or digital signal with a frequency in proportion to the speed of rotation of the tire 12a.

In step 56, the wheel speed ports 18a, 18b, 18c, 18d, 18e, 18f, 18g are monitored simultaneously. In the present example, a wheel speed signal will be received on wheel speed sensor port 18a because tire 12a is installed at the left front wheel location and wheel speed port 18a is physically connected to wheel speed sensor 14a. In step 58, the control logic 23 associates a wheel speed sensor signal from wheel speed sensor 14a received at wheel speed port 18a with the left front wheel location on the vehicle 10.

Meanwhile, the tire pressure sensor 16a located in tire 12a will begin generating a signal when tire 12a is rotated. In one embodiment, the tire pressure sensor 16a wakes up when the tire 12a is rotated due to motion detection, such as through the inclusion of a dual axis accelerometer or centrifugal switch in the tire pressure sensor 16a. When the motion detector detects motion, the tire pressure sensor 16a wirelessly transmits a signal carrying the tire characteristic information and unique sensor ID. The wireless receiver 24 receives the signal in the selected data format containing the tire characteristic information and unique sensor ID from the tire pressure sensor 16a wirelessly. The wireless receiver 24 decodes the tire characteristic information from the selected data format and creates a tire characteristic message capable of being communicated on a serial communication bus 20. The tire characteristic message includes the unique sensor identification and information regarding tire characteristics, such as pressure, rotation and temperature. The signal may also include information that the sensor is being rotated.

In step 59, the control logic 23 monitors for tire characteristic messages on the serial communication bus 20.

If a tire characteristic message is received in step 60, the control logic 23 determines if the tire characteristic message was received in a predetermined time period after the receipt of the wheel speed signal. In one embodiment, the predetermined time period is between about five seconds and fifteen seconds. In another embodiment, the predetermined time period is about ten seconds. If the predetermined time period has not been met or exceeded, the control logic 23 determines that the specific wheel location currently receiving the wheel speed signal is the same wheel location as from which the tire characteristic signal was transmitted. If no tire characteristic message is received in the predetermined time period, the control logic 23 transmits a fault signal to the communication bus 20 or to the display device 32 in step 66.

In step 62, the control logic 23 then associates the unique sensor ID from that tire characteristic message to that specific wheel location that is coupled to the wheel end rotation. For example, if a tire characteristic signal is received from tire sensor 16a while tire 12a is spinning and the receiver 24 has transmitted a tire characteristic message including the unique sensor ID of tire sensor 16a onto the serial communication bus 20 within the predetermined time period that from when a wheel speed sensor signal from wheel speed sensors 14a is received at wheel speed port 18a, the control logic 23 determines that the tire sensor 16a is associated with the left front wheel location, A tire characteristic signal from tire sensor 16a will now consistently be assigned to left front wheel location on the vehicle.

The control logic 23 transmits the wheel location and tire characteristic information as a new tire characteristic message on the serial communication bus 20; the new message containing the specific wheel location of the tire pressure sensor transmitting the message as part of the single message. Other controllers connected to the bus 20 may use this information to indicate vehicle tire status. The new tire characteristic message will inform the user or other controllers exactly where on the vehicle the tire problem exists without extensive manual operation of associating the tire pressure sensors with a particular tire on the vehicle.

The method proceeds to step 64 from steps 62 and 66 if all tires have not yet been rotated. Each tire 12b, 12e, 12d, 12e, 12f, 12g, 12h, 12i, 12j is rotated independently as part of the method 50. However, in some instances two tires can be located at one wheel location. In one example, tires 12e, 12d will be associated with the left mid wheel location when a signal from wheel speed sensor 14e is received at wheel speed port 18e. The outer tire 12e can be further identified from the inner tire 12d even though they are rotated together. Additional methods to identify which tire is the outer tire and inner tire are through the signal strength, the tire temperature increase or the accelerometer internal to the tire pressure sensor.

If all the tires have been rotated, the method ends at step 68.

Figure 3:
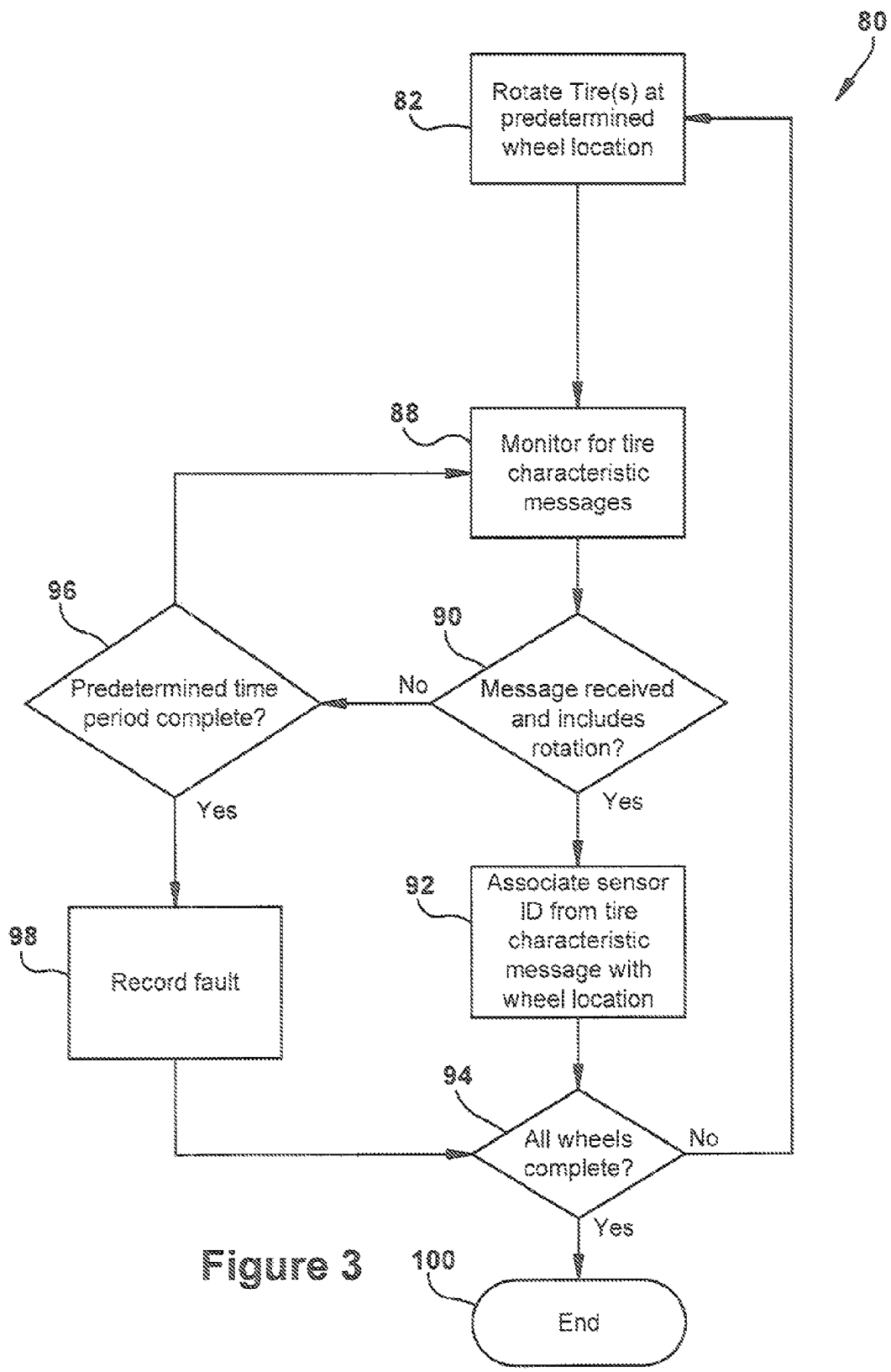
FIG. 3 illustrates another method of implementing the tire sensor system, according to an embodiment of the present invention.

A flowchart for implementing another method 80 of the present invention is shown in FIG. 3.

Each tire 12a, 12b, 12c, 12d, 12e, 12f, 12g, 12h, 12j is placed at a specific wheel location on the vehicle. At this point, the controller 22 does not have information regarding the placement of the tires 12a, 12b, 12c, 12d, 12e, 12f, 12g, 12h, 12j at a specific wheel location. In method 80, the tires are rotated in a predetermined sequence. In one embodiment, the predetermined sequence of rotation is known by the control logic 23.

For the first step in method 80, the tire 12a is rotated is step 82. The tire 12a can be rotated by an automated rotation device, such as a chassis dynamometer from Link Engineering Company. The tire 12a should be rotated for a minimum of about fifteen seconds at a speed of about three miles per hour. In one embodiment, the predetermined wheel location is received by the controller 22 from the dynamometer via the serial communication bus 20 or other means when the dynamometer begins rotation of the tire 12a, Alternatively, the tire 12a can be rotated manually.

The tire pressure sensor 16a located in tire 12a will begin generating a tire signal when tire 12a is rotated. However, in this embodiment, other sensors 16b, 16c, 16d, 16e, 16f, 16g, 16h, 16i, 16j on the vehicle may also be transmitting tire characteristic signals at infrequent intervals, for example every three to five minutes, regardless of rotation of the tire in which the sensor is located. In one embodiment, the tire pressure sensor 16a includes a motion detector, such as a dual axis accelerometer or centrifugal switch. When the motion detector detects motion, the accelerometer sends a signal to the tire pressure sensor 16a and the tire pressure sensor 16a promptly transmits a wireless signal carrying the tire characteristic information. The signal also includes information that the tire is rotating. The signal is received by the wireless receiver 24. The wireless receiver 24 decodes the signal and creates a tire characteristic message for communication on serial communication bus 20. This particular tire characteristic message will include information indicating the tire is rotating.

In step 90, the control logic 23 monitors the serial communication bus 20 for tire characteristic messages. The control logic 23 may monitor its own wireless receiver for signals containing the tire characteristic information and a unique sensor ID, if so equipped. However, the tire characteristic message must also include information indicating the tire is rotating in order for the control logic 23 to use the tire characteristic message as part of method 80 to configure the tire pressure monitoring system. For example, an acceleration value of between one g and three g in the tire characteristic message will indicate that the tire is rotating. However, dependent on the type of rotation sensor, a single bit in the tire characteristic message may indicate that the tire is rotating or not rotating. The tire characteristic message also includes the unique sensor ID and information regarding tire characteristics, such as pressure and temperature.

If a tire characteristic message is received in step 90 that includes an indication that the tire is rotating, the control logic 23 associates the specific wheel location at the predetermined rotation sequence as the same specific wheel location as the tire characteristic signal. The control logic 23 may not process tire characteristic messages that do not contain rotation information indicating the tire is currently being rotated.

In step 96, a predetermined time period is established in which the control logic 23 continues to monitor the bus for tire characteristic messages with an indication of tire rotation. In one embodiment, the predetermined time period is between about five seconds and fifteen seconds. In another embodiment, the predetermined time period is about ten seconds. If no tire characteristic message containing an indication of tire rotation is received before the expiration of the predetermined time period, the control logic 23 records a fault in step 98. The method proceeds to step 94.

If a message indicating rotation of the tire is received in step 90, the control logic 23 then assigns the unique sensor ID in step 92 to that specific wheel location that is coupled to the wheel end rotation. For example, if a tire characteristic signal is received from tire sensor 16a while tire 12a is spinning and the receiver 24 has transmitted a tire characteristic message including the unique sensor identification of tire sensor 16a onto the serial communication bus 20, the control logic 23 determines that the tire sensor 16a is associated with the left front wheel location. A tire characteristic signal from tire sensor 16a will now consistently be assigned to left front wheel location on the vehicle.

The control logic 23 transmits the wheel location and tire characteristic information as a new tire location message on the serial communication bus 20, the new tire location message containing the specific wheel location of the tire pressure sensor transmitting the message. Other controllers connected to the bus 20 may use this information to indicate vehicle tire status. The tire location message will inform the user or other controllers exactly where on the vehicle the tire problem exists without extensive manual operation of associating the tire pressure sensors with a particular tire on the vehicle.

The method proceeds to step 94 to determine if all tires have been rotated. Each tire 12b, 12c, 12d, 12e, 12f, 12g, 12h, 12i, 12j is rotated independently as part of the method 80. However, in some instances two tires can be located at one wheel location. In one example, tires 12c, 12d will be associated with the left mid wheel location when a signal from wheel speed sensor 14c is received at wheel speed port 18c. The outer tire 12c can be further identified from the inner tire 12d even though they are rotated together. Additional methods to identify which tire is the outer tire and inner tire are through the signal strength, the tire temperature increase or the internal accelerometer. In one embodiment, an accelerometer detects direction due to the mounting of the tire pressure sensors in the tires themselves. The tires on a dual tire mount are mounted in opposite directions; therefore, the sensors are mounted in opposite directions. For example, in a left mid tire location, the inner wheel would contain a sensor that would be rotating clockwise and the outer wheel would contain a tire pressure sensor that would be rotating counter clockwise.

If all the tires have been rotated, the method ends at step 100.

Accordingly, a method for configuring a tire pressure monitoring system is disclosed. The method comprises rotating a first tire of a plurality of tires on a vehicle; receiving a signal indicative of the speed of rotation of the first tire from a wheel speed sensor associated with the first tire; associating the first tire with a first wheel location in response to receiving the signal from the wheel speed sensor; generating a tire characteristic signal in response to the rotation of the first tire from a tire sensor associated with the first tire; receiving the tire characteristic signal; associating the tire characteristic signal with the first wheel location in response to receiving the tire characteristic signal within a first predetermined time period from receiving the signal indicative of the speed of rotation of the first wheel.

Accordingly, another method for configuring a tire pressure monitoring system is disclosed. The method comprises rotating a first tire of a plurality of tires on a vehicle; receiving a signal indicative of the rotation of the first tire as part of a tire characteristic message and associating the first tire with a first wheel location in response to receiving the tire characteristic message indicating the tire is rotating.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for configuring a tire pressure monitoring system comprising:
rotating a first tire of a plurality of tires on a vehicle;
receiving a signal indicative of the speed of rotation of the first tire from a wheel speed sensor associated with the first tire;
associating the first tire with a first wheel location in response to receiving the signal from the wheel speed sensor;
generating a tire characteristic signal in response to the rotation of the first tire from a tire sensor associated with the first tire, the tire characteristic signal comprising a unique sensor identification;
receiving the tire characteristic signal;
associating the unique sensor identification with the first wheel location in response to receiving the tire characteristic signal within a predetermined time period after receiving the signal indicative of the speed of rotation of the first tire.

2. The method as in claim 1, wherein the predetermined time period is between about five seconds and about fifteen seconds.

3. The method as in claim 1, further comprising: transmitting a tire location message, the message comprising the first wheel location and the unique sensor identification.

4. The method as in claim 1, wherein the first wheel is rotated for at least about fifteen seconds.

5. The method as in claim 1, further comprising: transmitting an indication of a fault when the predetermined time period has elapsed and the tire characteristic signal has not been received.

6. The method as in claim 5, wherein the indication of a fault is transmitted to at least one of a communication port and a display.

7. The method as in claim 1, wherein the first tire is rotated by an operator of the vehicle.

8. The method as in claim 1, wherein the first tire is rotated by an automated rotation device.

9. The method as in claim 8, further comprising:
rotating a second wheel, a third wheel and a fourth wheel by the automated rotation device in a predetermined sequence after associating the first wheel location and the unique sensor identification.

10. A controller for a tire pressure monitoring system comprising:
a plurality of wheel speed ports for receiving wheel speed sensor signals;
a receiver for receiving a plurality of tire characteristic signals, the tire characteristic signals including a unique sensor identification and tire characteristic information; and
a processing unit comprising control logic, wherein the control logic is in communication with the plurality of wheel speed ports and the receiver and capable of:
receiving a signal indicative of a speed of rotation of a first tire from a wheel speed sensor associated with the first time;
associating the first tire with a first wheel location in response to receiving the signal from the wheel speed sensor;
receiving a tire characteristic signal at the receiver within a predetermined time period after receiving the signal indicative of the speed of rotation of the first tire; and
associating the unique sensor identification of the received tire characteristic signal to the first wheel location in response to receiving the tire characteristic signal.

11. The controller as in claim 10, further comprising a communication port, wherein the control logic is further capable of transmitting a tire location message to the communication port, the message comprising the first wheel location, the unique sensor identification and the tire characteristic information.

12. The controller as in claim 10, wherein the tire characteristic information comprises at least one of a tire pressure, sensor battery level, tire rotation and a tire temperature.

13. The controller as in claim 10, wherein the predetermined time period is between about five seconds and about fifteen seconds.

14. The controller as in claim 10, wherein the controller is a braking system controller.

15. The controller as in claim 10, wherein the control logic is further capable of transmitting an indication of a fault when the tire characteristic signal is not received within the predetermined time period.

16. The controller as in claim 15, wherein the control logic is capable of transmitting the indication of a fault to at least one of a communication port and a display device.

17. A tire monitoring system comprising:
means for rotating a first wheel of a plurality of wheels on a vehicle;
a wheel speed sensor associated with the first wheel generating a wheel speed signal in response to the rotation of the first wheel;
a tire sensor located in the first wheel generating a tire characteristic signal in response to the rotation of the first wheel;
a processor for receiving the wheel speed signal and the tire characteristic signal; and means for associating the first wheel with a wheel location in response to receiving the wheel speed signal and associating the tire characteristic signal with the first wheel location in response to receiving the tire characteristic signal within a first predetermined time period.

* * * * *